Patented Dec. 15, 1936

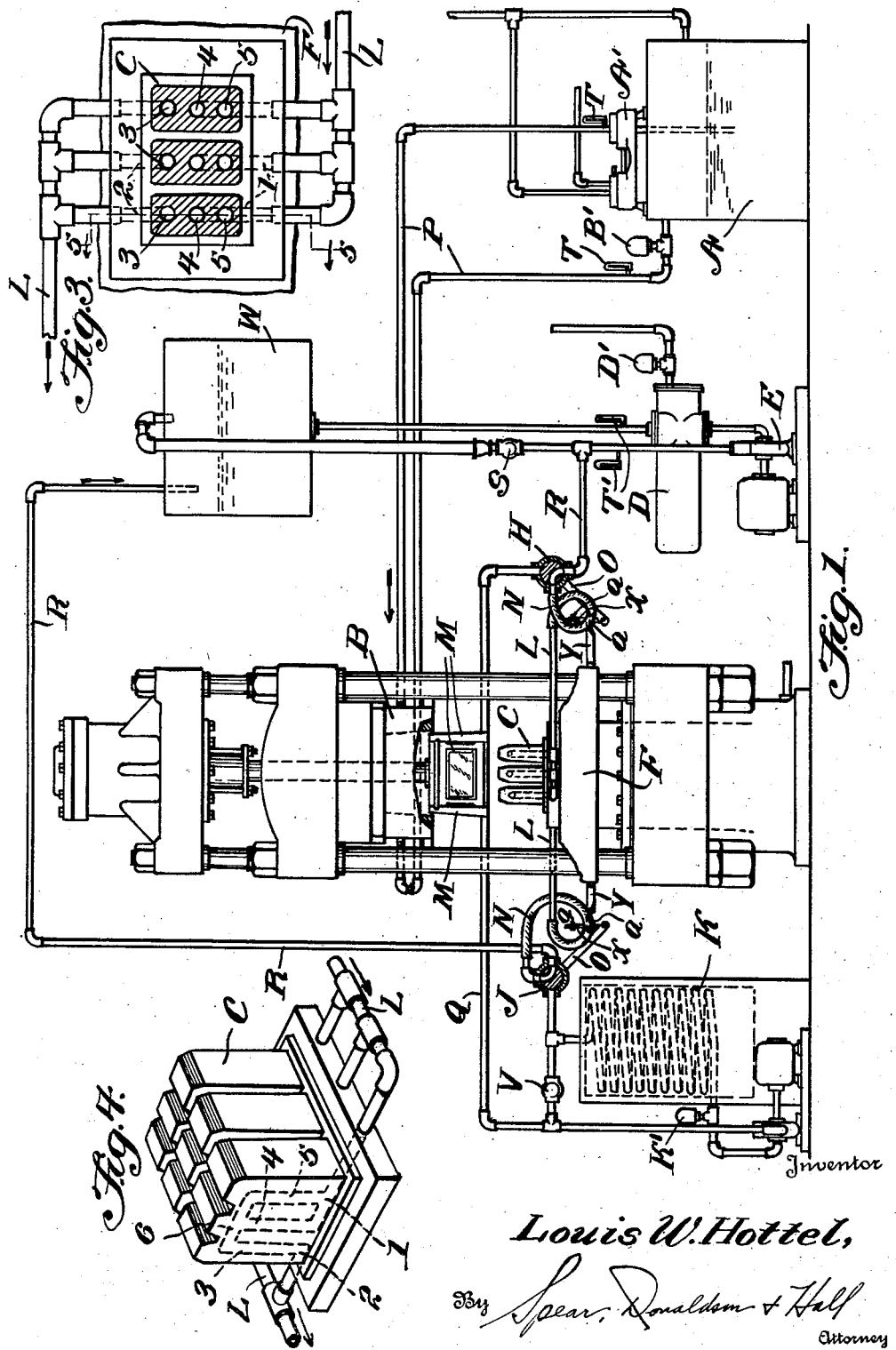

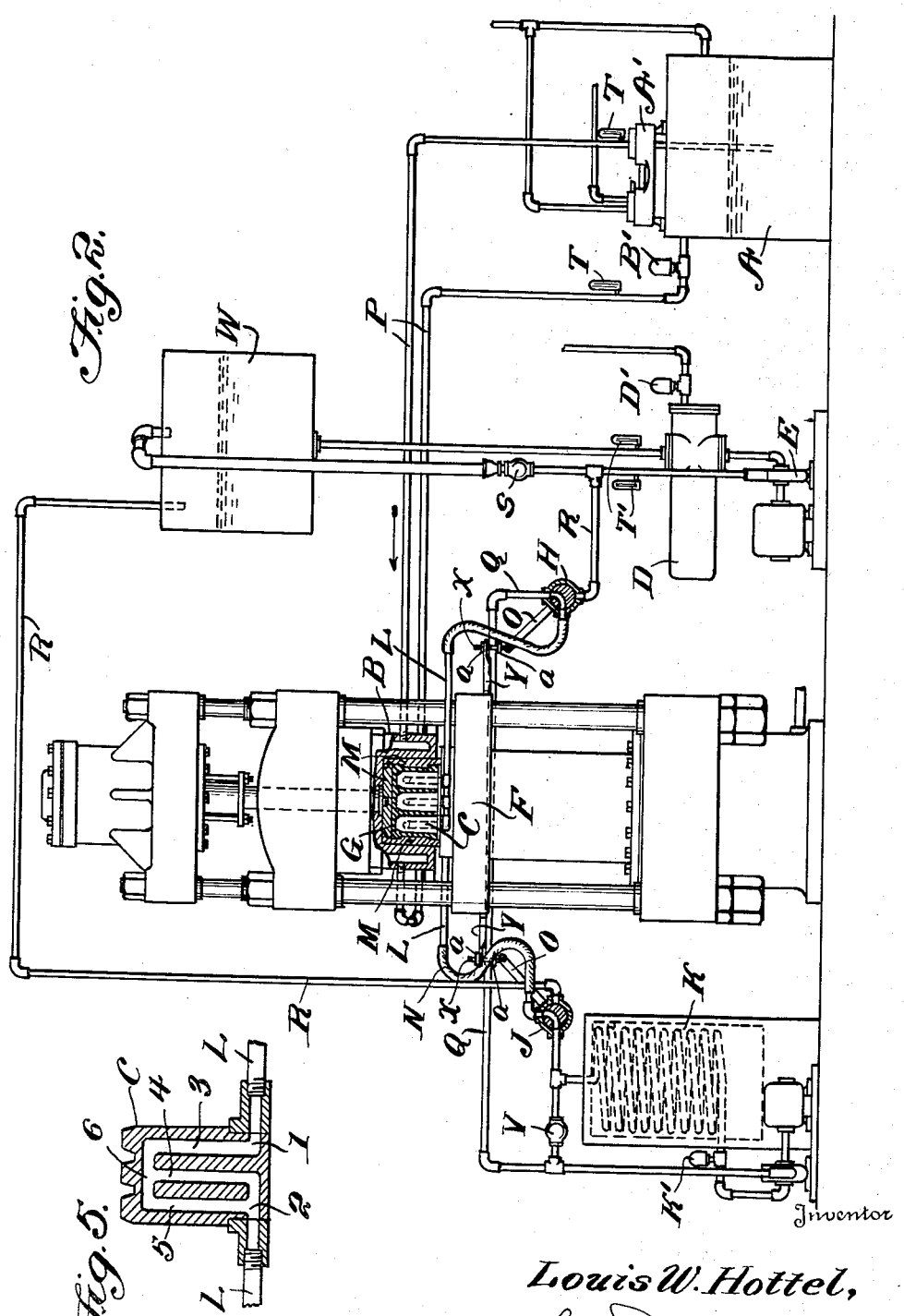

2,064,162

UNITED STATES PATENT OFFICE 2,064,162

APPARATUS FOR CONTROLLING THE TEMPERATURE OF PLASTIC MATERIALS DURING MOLDING

Louis W. Hottel, Indianapolis, Ind., assignor to The Richardson Company, Lockland, Ohio, a corporation of Ohio Application February 9, 1932, Serial No. 591,900

5 Claims. (Cl. 18—19)

The purpose of this invention is to obtain a temperature control of the mandrels and mold case of hydraulic presses used for the molding of plastic materials, which have first been mixed under controlled temperatures and transferred from the mixer, in a hot plastic state, to the press to be molded and shaped into various forms. This temperature control is particularly suited and adapted to the manufacture of battery containers, made of plastic material, which materials must necessarily remain at a constant temperature and must not come in contact with the mandrel or mold case that are of a temperature that would cause an undue chilling or hardening of the material, or any part thereof, before such material is pressed into its desired form.

Composition battery boxes are now generally made by the use of bitumen as a binder, mixed with the fibrous material, such as cotton linters, that acts as a tensile strength enhancing medium, together with a mineral filler, such as various forms of diatomaceous earth and silica. The primary factors necessary to produce a composition, molded battery box are tensile strength, rigidity, resistance to shock, and resistance to sulphuric acid of a specific gravity commonly used as the electrolyte.

The further purpose of this invention is to bring about a more flexible variation in the percentages or proportion of the bitumen, the binder, the tensile strength enhancing medium, and the filler. Particularly does it lend itself to the use of a larger percentage of any binder or non-acid-resisting matter, and yet produce a finished product in which the acid absorption is actually less than can be produced otherwise. The reason for this is that by the processes used heretofore, the temperatures of the cores or mandrels and the plates or mold casings are not uniformly controlled, whereby the temperature of the core and the plate is sufficiently cool to chill the material it comes in contact with, thereby causing a disintegration or breaking up of or pulverizing of the material on its surfaces, thereby producing a porous effect and rendering the material less acid-resistant. Furthermore, the material in being transferred to the press has radiated a portion of its heat and has become too rigid or stiff to cohere properly under pressure. My process renders the material more adaptable for proper cohesion to form a homogeneous mass.

The purpose of heating the core is not to increase the temperature of the molding material but to retard the cooling of those portions which are in direct contact with the core as the material is formed. The use of a suitable temperature will achieve this effect, causing a perfect union or cohesion of the material at surfaces in contact with the core. If a cold core were used (60° F.) the molding material that comes in direct contact with the core as the press closes would be cooled sufficiently to make it hard and crusty, and the remainder of the heat stored in the material would be insufficient to bring the crust to moldable temperature. This causes those surfaces referred to to have a porous physical structure, resulting in a material which is less resistant to acid, of lower tensile strength, more brittle, and otherwise materially changed in its physical properties. Furthermore, it is quite likely for small portions of this chilled material to be distributed throughout the box, thus preventing a perfect union of the materials wherever these portions appear. In addition several so-called flow lines will result in a number of places in the finished product. These lines are caused by sections of material meeting when said material is reduced in temperature sufficiently so as not to cause a perfect union or knit of the material when they meet. These lines usually occur at the last place or point the materials come together when the press is closed and they can be detected by a line visible to the naked eye. In a composition battery box, the material is forced about in the mold when the pressure is applied and it has a tendency to flow in the form of a thick sheet having surfaces which are moving in several directions. When the portions that have traveled the greatest distance and have been exposed to the cold surfaces of the core and plates for the greatest length of time meet, they form an unknitted section in the finished product. A strain applied at right angles to one of these flow lines would show a marked decrease in tensile strength as compared to a well knitted section of material and a break occurs at the flow line. By the present invention it is desired to eliminate these undesirable conditions by the use of a temperature control core, utilizing a specific temperature according to the nature of the compound.

By reference to the accompanying drawings my process can be readily understood.

Figure 1 is a diagrammatic view in elevation of one arrangement of apparatus exemplifying my system and method, and showing the press in open position.

Fig. 2 is a similar view showing the press in closed position.

Fig. 3 is a plan view partly in horizontal section showing the construction of the core members and connections for passage of temperature controlling fluid therethrough.

Fig. 4 is a perspective view of the core and connections.

Fig. 5 is a section substantially on line 5—5 of Fig. 3.

In Fig. 1 is shown a water heater tank A thermostatically controlled, as indicated at B', together with a water pump A' showing continuous circulation of the water at a given temperature through pipes P and through the die box or mold case B into which the mold plates M are drawn when the material is being pressed, and discharged when the box is to be extracted, thereby maintaining a uniform temperature on the plates during each operation of the press F.

A second water heater D is provided, thermostatically controlled as indicated at D' and connected to a circulating pump E forcing hot water through the valve H and through the hot water circuit including the pipes R and the core C when it is in its lowermost or initial position as the first step in the molding process, thereby raising the temperature of the core or mandrel C to a suitable temperature for the molding process. The relief valve S is closed during the passage of hot water through the core C, the relief valve V for cold water being open for return to refrigerating tank K. The fluid discharge valve J is open to the discharge of the hot water from the core.

Fig. 2 shows the press F in the closed position with the molded article G in position.

This figure also shows the core fluid admission valve H through which the hot water has been circulating, closed to the hot water, and opened to the passage of cold water as indicated, the cold water being forced through the core from the cold water tank K which is thermostatically controlled as indicated at K'. The cold water relief valve V is closed and the cold water passes through the core by means of pipes Q, and thence through core fluid discharge valve J which is opened to the passage of cold water therethrough. The hot water relief valve S is open for the passage of the hot water to tank W from which it returns to the heater D.

The water chambers and passages of the core are connected in circuit with the valves H and J, by means of conduits L including flexible portions N allowing for vertical movement of the core with respect to the stationary valves J and H. It will be noted that there is a continuous circulation of hot and cold water regardless of whether the press F is in open or closed position, thereby maintaining a constant temperature during the flow through the core of the hot water or of the cold water.

The valves J and H are automatically controlled by movements of the press, by means of lever and link connections O and X with brackets Y secured to the lower ram F. The brackets Y are provided with apertures loosely receiving the links X, free relative vertical movement between the links X and the brackets Y being controlled by stop nuts a. The loose connection between the links X and the brackets Y allows for tilting of the links in conformity with the swing of lever arms O.

As shown in Fig. 2, the valves H and J are actuated by upward movement of the lower ram F to closed position of the press, to open them to passage of cold water through pipes Q and through the core; and as shown in Fig. 1, these valves are actuated, upon downward movement of the lower ram F, to open them to passage of hot water through pipes R and through the core.

Thermometers are indicated at T and T' in connection with the inlet and outlet pipes of water heaters A and D.

The core C, as shown particularly in Figs. 3 and 4, comprises the three core elements each of which is provided with an independent connection with the core inlet and outlet conduits L.

The passages through each core element are of special construction, providing for maximum effective contact of the temperature controlling fluid uniformly throughout the body of the core element. As shown, the passage in each core element comprises lower horizontal inlet and outlet portions 1 and 2 on the same level near the bottom of the core element connected by vertical portions 3, 4, and 5 with an upper horizontal portion 6, one of the lower horizontal portions being connected with the upper horizontal portion by two of the said vertical portions 4 and 5. By this means is provided a continuous passage throughout the interior of the core element including a plurality of vertically disposed passage portions connected in parallel with upper and lower horizontal passage portions.

The direction of flow through the core is indicated by arrows in Figs. 3 and 4.

In the embodiment shown, the entering temperature controlling fluid is immediately divided into two streams 1 and 3 to effect uniform distribution through the core, the two streams having a common inlet and a common outlet.

The hot water system for the die box has the following characteristics according to one exemplification of my invention: The water shall be at a temperature so as to maintain the die box at a temperature from about 110° to 130° F. This heat is transferred to the plates of the mold through actual contact so that the plates are maintained at a temperature of approximately 125°. The rate of flow of the water through the die box and mold case shall be such as to carry off and supply heat at the necessary time.

In one case, and for a certain size core, in order to bring the core to a temperature of 150° F. a rate of flow of about 20 gallons per minute for about one-half minute may be required. The rate of flow should be rapid enough to change the fluid in each core cell about 150 times per minute. If we were making an article of larger dimensions than a battery container, it would be necessary to pass a larger volume of water through the mandrel. The larger the mandrel, the larger the opening and consequently the larger the volume of water but the replacement of the water should be in about the same proportion, whether large or small, to maintain the temperature desired.

The actual volume of water passing through a core, of a cell dimension used for a 6 volt 11 plate storage battery, is about 20 gallons per minute, and at this rate results in a complete change of the water about 150 times per minute.

To reduce the temperature of the core without the material therein to about 50° F. may require about 30 seconds, at the same rate of flow. The time element whether to raise or lower the temperature of the core depends upon the temperature of the water in the tank and the rate of flow. The time and temperature are to be determined by the character of the material to be used.

The hot and cold water system for the core has the following characteristics according to an exemplification of my invention: The hot water is at such a temperature and flows at such a rate as to heat the core to a temperature of about 115° to 150° F. (varying with the character of compound to be used) within one minute. The proper molding temperature is maintained for approximately 15 seconds after the press is completely closed until displacement of the hot water, at which time the cooling system begins the reduction in temperature.

The cold water system for the core has the following characteristics: The water shall be at such a temperature and flow at such speed as to reduce the temperature of the core without the material therein to 50° to 60° F. within approximately one-half minute after the press is closed. This example is given to illustrate the rapidity of cooling of the core alone which correspondingly effects the reduction of temperature of the molded product in the actual molding operation to a point such that it may be removed from the mold, as described in the following.

The operation of my invention in one exemplification, is as follows:—

For molding a composition product, such as a storage battery container, according to my invention, the ordinary or improved fibrated asphalt mixture used for storage battery containers is formed in a mixing machine. A batch of this mixture at a temperature of about 340° F. is removed from the mixing machine.

The mix is placed in an extruding machine, which is kept at a temperature from 300° to 325° F. This machine facilitates the weighing out of the material for molding. The material is then weighed out in the proper amounts to mold the particular products and then transported to steam-heated ovens, the temperature of same being about 300° F. The plastic material to be molded shall be at a temperature in the range of 250° to 300° F.

The plates M are drawn by a piston into the die box B. The core C is at its lowermost position and is being heated to its proper temperature as stated above. The material to be formed is at a temperature from 250° to 300° F. and in a convenient form for handling. The same is placed on the core C or into a mold case and the hydraulic pressure is applied below the lower ram F. The construction is such that when the ram of the press covers about the entire travel upwards, the valve H controlling the hot and cold water system is automatically closed to the heated water and opened to allow the passage of the cold water through the core. The action of the press controls the valve as shown in the drawings and hereinbefore described. The heat of the molding material helps to maintain the proper temperature on the core for a specified time. When the press is closed and 15 seconds is passed, a reduction of temperature on the core starts and continues for from 2 to 5 minutes, at which time the box proper is brought to such a temperature that it may be removed and after removal of the product from the mold, no unwarranted distortion will take place. At the end of about two to five minutes after complete closing of the press, the molding cycle is complete. The hydraulic pressure is then released and the hydraulic pressure is applied to the piston above to which is assembled the plates forming the mold case of the box and they are forced downward out of the die box.

As the core C, carried by the lower ram F, in its downward movement reaches the point midway between its highest and lowest position, the valve H controlling the hot and cold water is closed to the cold water and opened to allow the passage of the hot water, which is circulated through the core C by the special coring, as shown in the drawings. When the core reaches its lowest position, the plates M for the finished product are forced entirely out of the die box and the plate towards the front of the press then removed and the finished product extracted.

The product is a one-piece, multi-cell battery container of fibrated asphalt.

While I have shown only one press in the drawings as being connected for temperature control according to the invention, it will be apparent that any number of presses can be so arranged.

It is not desired to limit the invention to any particular temperatures, rate of flow, or volume of water, or time of action, nor to any particular type of molding process. It is considered that this process would be quite feasible and quite practical, if used for molding rubber box, wherein vulcanization took place. Particularly is this considered as embraced by the present invention in respect to the cooling of the core according to this invention as the methods now used in the rubber box vulcanized under heat and pressure is to remove the box and in order to retain its original dimensions and shape, forms are placed inside of the cell, which is not necessary according to the present invention.

I claim:

1. In apparatus for controlling the temperature of moldable material of the kind that is shaped while under high temperature and that sets and hardens by cooling, the said apparatus including a mold, a die box for the reception of the mold, and a core member having passages therein and being movable into and out of the mold; a heated fluid circulatory system connected to the die box including means for controlling the temperature of the fluid therein to constantly maintain a uniform predetermined temperature in the said die box throughout the entire period of each operation of the apparatus, and separate means for providing circulation of temperature-controlling fluids through the core member, the said last-named means including conduits, each having one end connected to said core a hot fluid circulatory system, a cold fluid circulatory system, and two two-way valves for connecting the other ends of said conduits with the said fluid circulatory systems, one of said valves permitting the passage of hot fluid to the core through one of said conduits while the other of said valves permits discharge of hot fluid from the core through another of said conduits to the hot fluid circulatory system while the core is in its withdrawn position, and the first-mentioned valve of said valves permitting the passage of cold fluid to the core through said one of said conduits while the last-named valve of said valves permits discharge of cold fluid from the core through said other of said conduits to the cold fluid circulatory system while the core is in the mold, the said valves being actuated by the movement of the said core relative to said constant temperature die box.

2. In apparatus according to claim 1, said core being carried by a movable ram of a press, said valve means being stationary, and connections between said movable ram and valve means to operate the valve means in accordance with movement of said ram, flexible fluid conduit means between said core and said valve means, said operating connections including a valve actuating lever, a bracket secured to said movable ram and provided with an aperture, and a link pivoted to the lever and loosely passing through said aperture, said link having spaced stop nuts thereon by which the actuation of said link and lever by said bracket is effected, said spaced stop nuts providing for limited free movement between the bracket and link.

3. In apparatus according to claim 1, said core having a continuous passage therethrough for temperature controlling fluid, said passage including lower horizontal inlet and outlet portions, connected by vertical portions with an upper horizontal portion, one of the lower horizontal portions being connected with the upper horizontal portion by two of said vertical portions.

4. In combination in apparatus for controlling the temperature of moldable material during molding, a die box, a core movable into and out of said die box, means for supplying hot fluid to the core, means for supplying cold fluid to the core, means controlled by the position of the core relative to the die box for alternately communicating said hot fluid supply means and said cold fluid supply means with said core, means maintaining a circulation of temperature-controlling, heated fluid through the die box continuously during the entire period of each operation of the apparatus, and means controlling the temperature of said circulated fluid to constantly maintain a uniform predetermined temperature in the die box during said alternate communication of said hot and cold fluid supply means with said core and during the entire period of each operation of the apparatus.

5. In combination in apparatus for controlling the temperature of moldable material during molding, a die box, a core movable into and out of the said die box, means for supplying hot fluid to the core, means for supplying cold fluid to the core, means controlled by the position of the core relative to the die box for alternately communicating the said hot fluid supply means and the said cold fluid supply means with the said core, means maintaining a circulation of fluid in heat exchange relation to the die box continuously during the entire period of each operation of the apparatus, and means controlling the temperature of the said circulated fluid to constantly maintain a uniform predetermined temperature in the die box during said alternate communication of the said hot and cold fluid supply means with the said core and during the entire period of each operation of the apparatus.

LOUIS W. HOTTEL.